United States Patent
Bao et al.

(10) Patent No.: US 12,089,095 B2
(45) Date of Patent: *Sep. 10, 2024

(54) MEASUREMENT REPORTING METHOD AND DEVICE

(71) Applicant: VIVO MOBILE COMMUNICATION CO., LTD., Dongguan (CN)

(72) Inventors: Wei Bao, Dongguan (CN); Xiaodong Yang, Dongguan (CN); Yu Ding, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,255

(22) Filed: May 17, 2023

(65) Prior Publication Data
US 2023/0292190 A1    Sep. 14, 2023

Related U.S. Application Data

(63) Continuation of application No. 16/959,224, filed as application No. PCT/CN2018/124251 on Dec. 27, 2018, now Pat. No. 11,696,192.

(30) Foreign Application Priority Data

Jan. 9, 2018    (CN) .......................... 201810018031.8

(51) Int. Cl.
*H04W 36/00*    (2009.01)
*H04W 24/10*    (2009.01)
*H04W 48/16*    (2009.01)

(52) U.S. Cl.
CPC ....... *H04W 36/0058* (2018.08); *H04W 24/10* (2013.01); *H04W 36/0072* (2013.01);
(Continued)

(58) Field of Classification Search
CPC ............. H04W 24/10; H04W 36/0061; H04W 36/0088; H04W 36/00835; H04W 36/0058
See application file for complete search history.

(56) References Cited

U.S. PATENT DOCUMENTS

| 2011/0195668 A1 | 8/2011 | Lee et al. |
| 2012/0040621 A1 | 2/2012 | Jung et al. |

(Continued)

FOREIGN PATENT DOCUMENTS

| CN | 101557615 A | 10/2009 |
| CN | 101610536 A | 12/2009 |

(Continued)

OTHER PUBLICATIONS

International Search Report & Written Opinion related to Application No. PCT/CN2018/124251; reported on Feb. 25, 2019.
Chinese Office Action for related Application No. 201810018031.8; reported on Mar. 10, 2020.
European Search Report related to Application No. 18900384.1; reported on Feb. 2, 2021.

(Continued)

*Primary Examiner* — Nam T Huynh
(74) *Attorney, Agent, or Firm* — von Briesen & Roper, s.c.

(57) ABSTRACT

An embodiment of the present disclosure provides a measurement reporting method and device. The method includes: starting a timer according to a measurement configuration of a target cell transmitted by a network side; determining, before the timer expires, that identification information of the target cell cannot be obtained; and reporting, to the network side, that the identification information of the target cell cannot be obtained by the UE.

10 Claims, 7 Drawing Sheets

(52) U.S. Cl.
CPC ....... *H04W 36/0083* (2013.01); *H04W 48/16* (2013.01); *H04W 36/00835* (2018.08)

(56) References Cited

U.S. PATENT DOCUMENTS

| | | |
|---|---|---|
| 2013/0072182 A1 | 3/2013 | Jung et al. |
| 2013/0089029 A1 | 4/2013 | Jang et al. |
| 2014/0206341 A1 | 7/2014 | Siomina et al. |
| 2015/0126205 A1 | 5/2015 | Kim et al. |
| 2015/0257028 A1 | 9/2015 | Chu et al. |
| 2015/0271864 A1 | 9/2015 | Nigam et al. |
| 2016/0050590 A1 | 2/2016 | Ponukumati et al. |
| 2016/0073306 A1 | 3/2016 | Yang et al. |
| 2017/0353257 A1 | 12/2017 | Islam et al. |
| 2019/0007893 A1 | 1/2019 | Thanggarasa et al. |

FOREIGN PATENT DOCUMENTS

| | | |
|---|---|---|
| CN | 102104897 A | 6/2011 |
| CN | 102158865 A | 8/2011 |
| CN | 102281578 A | 12/2011 |
| CN | 102754469 A | 10/2012 |
| CN | 102948202 A | 2/2013 |
| CN | 103369577 A | 10/2013 |
| CN | 103858489 A | 6/2014 |
| CN | 103916888 A | 7/2014 |
| CN | 104272793 A | 1/2015 |
| CN | 107071842 A | 8/2017 |
| EP | 2448314 A3 | 5/2012 |
| EP | 2525599 A1 | 11/2012 |
| EP | 2849480 A1 | 3/2015 |
| EP | 3198934 | 8/2017 |
| WO | 2016048210 A1 | 3/2016 |
| WO | 2017123144 A1 | 7/2017 |

OTHER PUBLICATIONS

Korean Office Action for related Application No. 10-2020-7018577; reported on May 24, 2021.
Indian Office Action for related Application No. 202027033643; reported on Aug. 8, 2021.
U.S. Non-Final Office Action for related U.S. Appl. No. 16/959,224; reported on Aug. 19, 2021.
Japanese Office Action for related Application No. 2020-537696; reported on Oct. 18, 2021.
3rd Generation Partnership Project, "Technical Specification Group Radio Access Network; Evolved Universal Terrestrial Radio Access (E-UTRA); Radio Resource Control (RRC); Protocol specification", (Release 9), Jun. 2013, 3GPP TS 36.331 V9.15.0.
3rd Generation Partnership Project. "Measurement configuration control and reporting", (Release 14), Sep. 2017, 3GPP TS 36.523-1 V14.2.0.
Vivo, "Views on NR-PBCH contents and payload size", Aug. 21-25, 2017, 3GPP TSG-RAN WG1 NR Meeting #90, Prague, Czech Republic, R1-1712824.
RAN2, "LS on cells not broadcasting SIB1", Nov. 27-Dec. 1st, 3GPP TSG-RAN WG1 #91, Reno, USA, R1-1721695.
Huawei, Hisilicon, "Automatic Neighbour Relation in NR", Jun. 27-29, 2017, 3GPP TSG-RAN WG2 NR Ad Hoc, Qingdao, China, R2-1706747.
Qualcomm Incorporated, "Organization of NR System Information", Oct. 9-13, 2017, 3GPP TSG-RAN WG2 Meeting #99bis, Prague, Czech Republic, R2-1713636.
RAN2, "LS on cells not broadcasting SIB1", Nov. 27, 2017-Dec. 1st, 3GPP TSG-RAN WG2 #100, Reno, USA, R2-1714205.
Vivo, "ANR for EN-DC and NR Standalone", Apr. 16-20, 2017, 3GPP TSG-RAN WG2 Meeting #101bis, Sanya, China, R2-1804595.
CATT, "ANR and X2 setup for EN-DC scenario", Jun. 27-29, 2017, 3GPP TSG RAN WG3 Meeting #ADHOC, Qingdao, China, R3-172210.

MEASUREMENT REPORTING METHOD AND DEVICE

CROSS-REFERENCE TO RELATED APPLICATIONS

The present application a continuation of U.S. patent application Ser. No. 16/959,224 filed on Jun. 30, 2020, which is the U.S. national phase of PCT Application No. PCT/CN2018/124251 filed on Dec. 27, 2018, which claims a priority to Chinese Patent Application No. 201810018031.8 filed in China on Jan. 9, 2018, the disclosures of which are incorporated herein by reference in their entireties.

TECHNICAL FIELD

The embodiments of the present disclosure relate to the field of communication technologies, and in particular, to a method and device for measurement reporting.

BACKGROUND

With development of mobile communication technology, more and more technologies have been introduced to improve communication efficiency. For example, a mechanism of Long Term Evolution (LTE) Automatic Neighbor Relation (ANR) is introduced: in order to perform handover and interference coordination, an evolved Node B (eNB) needs to establish and maintain a neighbor relation table for its cells. A function of automatic neighbor relation is used to assist the eNB to discover unconfigured neighbor cells and trigger establishment and maintenance operations of corresponding entries in the neighbor relation table. The mechanism of the automatic neighbor relation is not only suitable for discovering neighbor cells of a same frequency, but also used for discovering neighbor cells of different frequencies and neighbor cells of different systems. A process of neighbor cell discovery is shown in FIG. 1.

Figure 1:
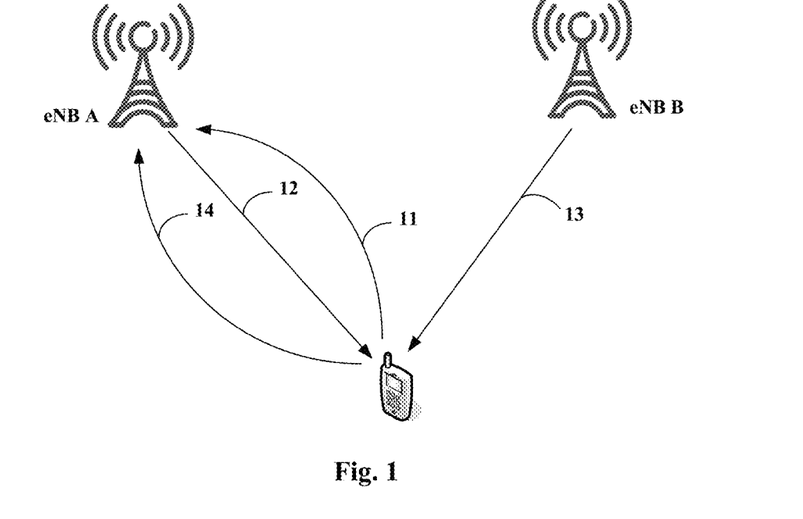
FIG. 1 is a schematic diagram of an example of ANR function.

In FIG. 1, a User Equipment (UE) within coverage of an eNB A completes conventional measurement of neighbor cells and reports measurement results. In a measurement report, a combination of a frequency and a Physical Cell Identifier (PCI) of a cell B is used as an identifier of the measured cell (step 11). The eNB A finds that the frequency and the PCI carried in the measurement report correspond to an unconfigured neighbor cell, then instructs the UE to read broadcast information of the cell corresponding to the combination of the frequency and the PCI, so as to obtain parameters of the cell B, such as Cell Global Identifier (CGI), Tracking Area Code (TAC) and Public Land Mobile Network (PLMN) identifier. The instruction command is issued to the UE in a form of a measurement configuration, and is associated with a measurement identification (ID) (step 12). After obtaining the above measurement configuration, the UE starts a timer and starts a system information acquisition process of a target cell (step 13); if the UE obtains the required system information before the timer expires, it reports to the network the above measurement ID and the information of the cell B, such as the PCI, the TAC, the CGI, the PLMN (step 14); if the UE has not obtained all the required system information when the timer expires, the UE reports the above measurement ID to the network. Because the required system information is not included in the reported content, the eNB A can infer that the UE failed to obtain the required information of the neighbor cell. If the UE successfully obtains and feeds back the required information, the eNB A can add the cell B to a neighbor relation table of a cell A. In the figure, parameters corresponding of the eNB A include: Cell A, Freq=M, PCI=N, GCI=O, and parameters corresponding to the eNB B include: Cell B, Freq=X, PCI=Y, GCI=Z.

Compared with traditional manual configuration process of neighbor relation, the mechanism of the automatic neighbor relation not only avoids calculation of engineering parameters during a planning stage and path test assistance during a optimization stage, but also reduces occurrence of missing of matching and mismatching in the neighbor cells, and it improves optimization efficiency while reducing costs.

When the mechanism of LTE ANR is used for New Radio (NR), the following problem will occur: if the UE finds that an NR cell does not broadcast Remaining Minimum System Information (RMSI) after reading system information of the NR (for example, Master Information Block (MIB) does not contain acquisition auxiliary information of the RMSI or indicates that the RMSI is not broadcast), the UE cannot report until the timer expires. Based on the reporting of the UE, a serving base station of the UE cannot know that a failure to read the system information of the target cell is caused by that the target cell does not broadcast, resulting that the serving base station might configure another UE to continue to measure the target cell.

SUMMARY

An object of the embodiments of the present disclosure is to provide a measurement reporting method and device.

In the first aspect, a measurement reporting method applied to a UE is provided, including: starting a timer according to a measurement configuration of a target cell transmitted by a network side; determining, before the timer expires, that identification information of the target cell cannot be obtained; and reporting, to the network side, that the identification information of the target cell cannot be obtained by the UE.

In the second aspect, a measurement reporting method applied to a UE is further provided, including: starting a timer according to a measurement configuration of a target cell transmitted by a network side; obtaining, before the timer expires, system information required by the target cell; and transmitting, to the network side, the system information required by the target cell and a transmission frequency of an MIB, wherein the MIB is an MIB of transmission location information of RMSI, and the transmission location information of the RMSI is actually read by the UE.

In a third aspect, a UE is further provided, including: a first configuration module, used to start a timer according to a measurement configuration of a target cell transmitted by a network side; a determining module, used to determine, before the timer expires, that identification information of the target cell cannot be obtained; and a first reporting module, used to report, to the network side, that the identification information of the target cell cannot be obtained by the UE.

In a fourth aspect, a UE is further provided, including: a second configuration module, used to start a timer according to a measurement configuration of a target cell transmitted by a network side; an obtaining module, used to obtain, before the timer expires, system information required by the target cell; and a second reporting module, used to transmit, to the network side, the system information required by the target cell and a transmission frequency of an MIB, wherein the MIB is an MIB of transmission location information of RMSI, and the transmission location information of the RMSI is actually read by the UE.

According to a fifth aspect, a UE is further provided, including: a processor, a memory, and a computer program stored on the memory and executable on the processor, wherein the program is used to be executed by the processor to implement steps of the measurement reporting method according to the first aspect; or steps of the measurement reporting method according to the second aspect.

According to a sixth aspect, a computer-readable storage medium is further provided, wherein a computer program is stored on the computer-readable storage medium, and the computer program is used to be executed by a processor to implement steps of the measurement reporting method according to the first aspect; or steps of the measurement reporting method according to the second aspect.

BRIEF DESCRIPTION OF THE DRAWINGS

Various other advantages and benefits will become apparent to a person skilled in the art upon reading the detailed description of the preferred embodiments below. The accompanying drawings are only for the purpose of illustrating the preferred embodiments and are not considered to be a restriction on the present disclosure. Moreover, same reference numerals are used to represent same parts throughout the accompanying drawings. In the drawings.

DETAILED DESCRIPTION

Technical solutions in the embodiments of the present disclosure will be described clearly and completely below in combination with the accompanying drawings in the embodiments of the present disclosure. Obviously, the described embodiments merely relate to a part of, rather than all of, the embodiments of the present disclosure. Based on the embodiments in the present disclosure, all other embodiments obtained by a person skilled in the art without creative efforts also fall within the protection scope of the present disclosure.

The term "include" and any variants thereof in the specification and the claims of this application are intended to cover non-exclusive inclusions, for example, processes, methods, systems, products, or devices that include a series of steps or units need not be limited to those steps or units that are explicitly listed, but may include other steps or units that are not explicitly listed or that are inherent to these processes, methods, products, or devices. In addition, the term "and/or" that used in the specification and the claims indicates at least one of associated objects; for example, A and/or B indicates individual A, individual B, or A and B.

In the embodiments of the present disclosure, such word as "exemplary" or "for example" is used as an example, illustration, or description. Any embodiment or design described as "exemplary" or "for example" in the embodiments of the present disclosure should not be construed as more preferred or advantageous over other embodiments or designs. Specifically, use of words such as "exemplary" or "for example" is intended to present related concepts in a concrete manner.

In order to better illustrate the technical solutions of the embodiments of the present disclosure, a process of system information transmission of a New Radio (NR) system is discussed in the following.

In the NR system, the system information includes Minimum System Information (MSI) and other System Information (other SI). The MSI is transmitted in two parts: Master Information Block (MIB) and Remaining MSI (RMSI). The RMSI is also known as System Information Block 1 (SIB1). Some or all of identification information of the cell required by ANR, such as CGI, TAC, and PLMN identifier, are broadcast in the RMSI, and the remaining part (if any) is broadcast in the other SI. Scheduling information transmitted by the other SI is indicated by the RMSI, that is, the UE must obtain the RMSI before obtaining the other SI.

The UE can search for the MIB in a set of preset frequency locations, and once the MIB is found, transmission parameters of the RMSI, such as frequency location, can be determined according to indications of the MIB. That is, the UE must obtain the MIB before obtaining the RMSI.

Figure 2:
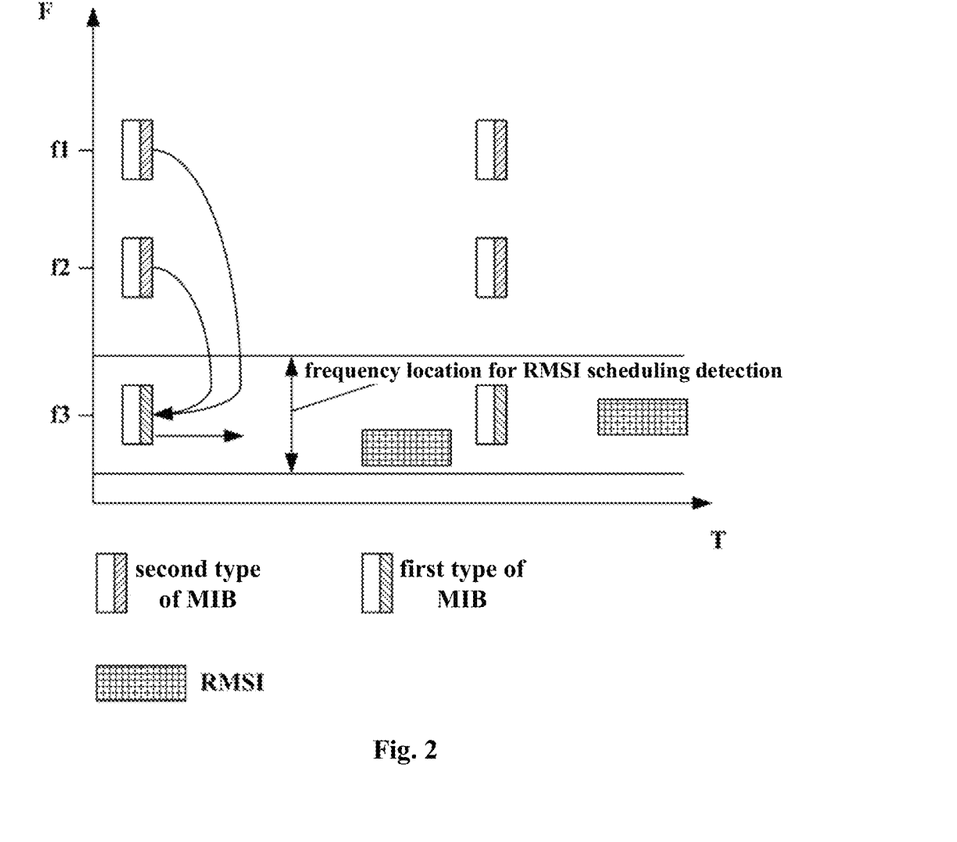
FIG. 2 is a schematic diagram of transmission frequency location information.

However, in certain network configurations, the MIB does not indicate the transmission parameters of the RMSI:

Case 1: a current NR cell does not work independently, and it does not need to broadcast the RMSI;

Case 2: the current NR cell has a wide bandwidth and contains multiple frequencies of a set of preset frequency locations. It indicates the transmission parameters of the RMSI on the MIB transmitted at only some of the multiple frequencies (a MIB containing RMSI parameter indication information is called a first type of MIB); if there is a MIB to be transmitted at remaining frequencies, although the MIB does not indicate transmission parameters of the RMSI (a MIB that does not contain the RMSI parameter indication information is called a second type of MIB), but it can indicate transmission configuration information of the first type of MIB, such as transmission frequency location information, as shown in FIG. 2.

The embodiments of the present disclosure will be described below in combination with the accompanying drawings. The measurement reporting method and device provided by the embodiments of the present disclosure can solve a problem that: after the UE reads the system information of the NR cell, if the NR cell does not broadcast the RMSI, the UE must wait for expiring of a timer before reporting. Therefore, in the embodiments of the present disclosure, the timer is started according to a measurement configuration of a target cell transmitted by the network side, and when it is determined that the identification information of the target cell cannot be obtained, it is reported to the network side that the UE cannot obtain the identification information of the target cell, so as to avoid that the UE needs to wait for expiring of the timer before triggering report, and the ANR measurement process of the UE is accelerated.

Figure 3:
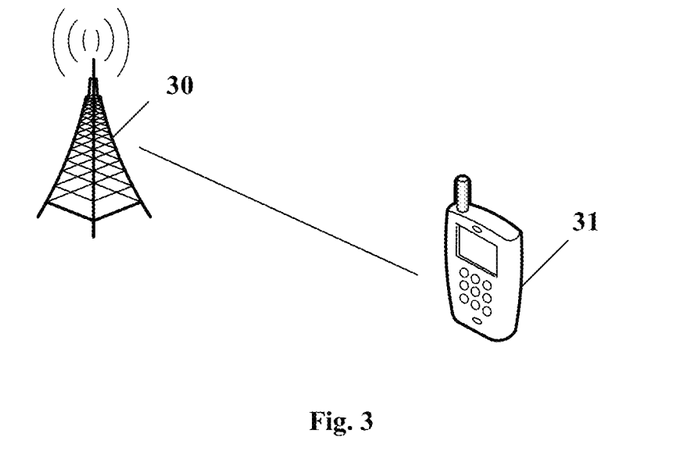
FIG. 3 is a schematic structural diagram of a wireless communication system according to an embodiment of the present disclosure.

The measurement reporting method and device can be applied to a wireless communication system. The wireless communication system may be a 5th Generation (5G) mobile communication system (referred to as a 5G system for short hereinafter). Referring to FIG. 3, a schematic structural diagram of a wireless communication system according to an embodiment of the present disclosure is provided. As shown in FIG. 3, the wireless communication system may include a network-side device 30 and a UE. For example, the UE may be referred to as a UE 31, and the UE 31 may communicate with the network-side device 30. In a practical application, a connection between the above devices may be a wireless connection. In order to conveniently and intuitively represent a connection relationship between various devices, a solid line is used in FIG. 3 for illustration.

It should be noted that the above wireless communication system may include a plurality of UEs, and a network-side device may communicate with the plurality of UEs by transmitting signaling or transmitting data.

The network-side device provided by the embodiments of the present disclosure may be a base station, and the network-side device may be, e.g., a commonly used base station, or an Evolved Node Base station (eNB), or a network-side device in the 5G system (such as a next generation Node Base station (gNB) or a Transmission and Reception Point (TRP)).

The UE provided in the embodiments of the present disclosure may be a mobile phone, a tablet computer, a notebook computer, an Ultra-Mobile Personal Computer (UMPC), a netbook, or a Personal Digital Assistant (PDA), etc.

In order to make objectives, technical solutions, and advantages of the present disclosure more clear, the technical solutions in the embodiments of the present disclosure will be described clearly and completely below in combination with the accompanying drawings in the embodiments of the present disclosure. Obviously, the described embodiments merely relate to a part of, rather than all of, the embodiments of the present disclosure. Based on the embodiments in the present disclosure, all other embodiments obtained by a person skilled in the art without creative efforts also fall within the protection scope of the present disclosure.

Figure 4:
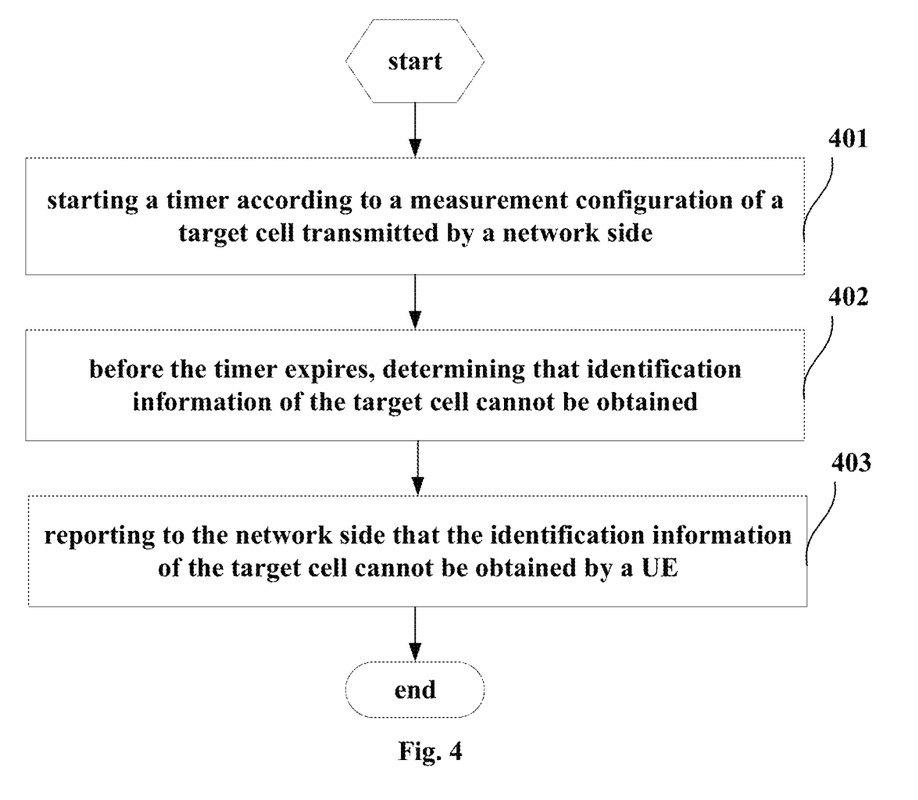
FIG. 4 is a first flowchart of a measurement reporting method according to an embodiment of the present disclosure.

Referring to FIG. 4, a flowchart of the measurement reporting method according to an embodiment of the present disclosure is provided. The method may be executed by the UE, and the specific steps are as follows.

Step 401: starting a timer according to a measurement configuration of a target cell transmitted by a network side.

Optionally, the timer may be configured by a network side or predefined in a protocol.

Step 402: before the timer expires, determining that identification information of the target cell cannot be obtained.

Optionally, in step 402, before the timer expires, information of an MIB of the target cell is obtained according to the measurement configuration; and when the information of the MIB carries a first indication indicating that the target cell does not broadcast RMSI, it is determined that the identification information of the target cell cannot be obtained.

Optionally, the first indication is represented by one or several predetermined code points or a combination of the predetermined code points, wherein the one or more predetermined code points are carried by one field in the information of the MIB, and the combination of the predetermined code points is carried by multiple fields in the information of the MIB.

Step 403: reporting to the network side that the identification information of the target cell cannot be obtained by the UE.

Optionally, in step 403, the timer is stopped before the timer expires; and it is reported to the network side that the identification information of the target cell cannot be obtained by the UE.

Optionally, in step 403, the timer is stopped before the timer expires; and it is explicitly or implicitly reported to the network side that the identification information of the target cell cannot be obtained by the UE. For example, the way of explicit reporting is as follows: transmitting second indication information to the network side, wherein the second indication information indicates that the target cell does not broadcast the identification information of the cell or RMSI.

In this way, it is unnecessary for the UE to wait for expiring of the timer before triggering to report, and an ANR measurement process of the UE is accelerated.

Figure 5:
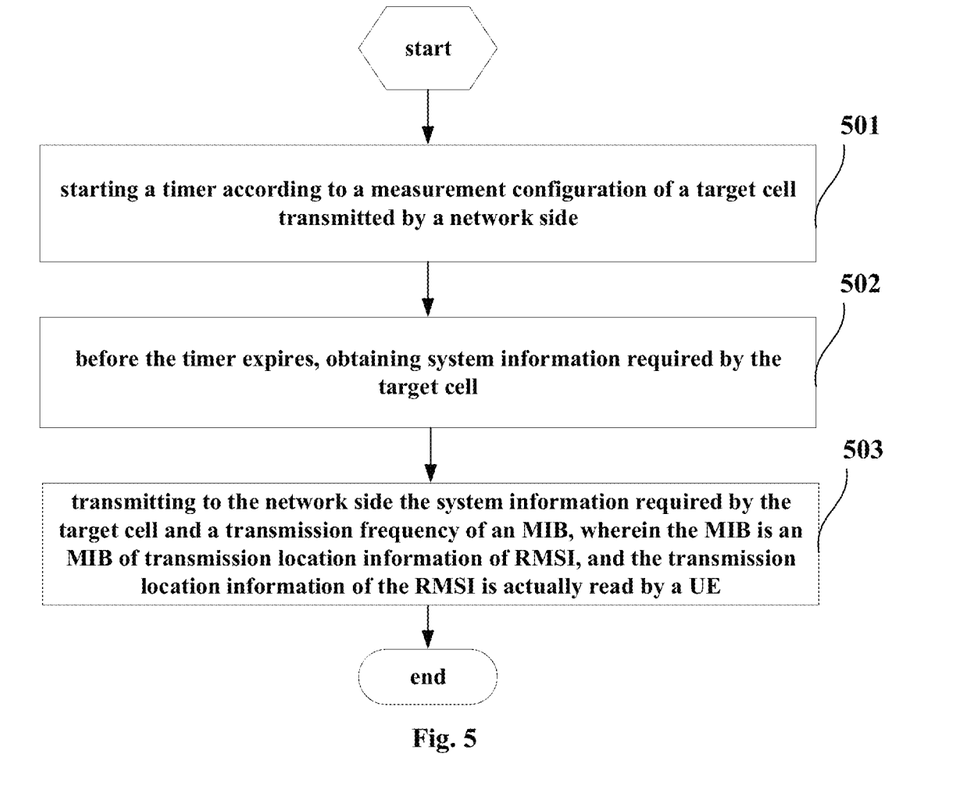
FIG. 5 is a second flowchart of the measurement reporting method according to an embodiment of the present disclosure.

Referring to FIG. 5, a flowchart of the measurement reporting method according to an embodiment of the present disclosure is provided. The method may be executed by the UE, and the specific steps are as follows.

Step 501: starting a timer according to a measurement configuration of a target cell transmitted by a network side.

Optionally, the timer may be configured by a network side or predefined in a protocol.

Step 502: before the timer expires, obtaining system information required by the target cell according to the measurement configuration.

Optionally, the system information required by the target cell refers to system information that the UE needs to report, which includes but is not limited to PCI, TAC, CGI and PLMN of the target cell.

Step 503: transmitting to the network side the system information required by the target cell and a transmission frequency of an MIB, wherein the MIB is an MIB of transmission location information of RMSI, and the transmission location information of the RMSI is actually read by the UE.

Optionally, in step 503, the timer is stopped; and the system information required by the target cell and the transmission frequency of the MIB is transmitted to the network side.

In this way, it is unnecessary for the UE to wait for expiring of the timer before triggering to report, and an ANR measurement process of the UE is accelerated.

Example 1: A Scenario in which the RMSI is not Broadcast Over the Network is Provided Referring to FIG. 6, a flowchart of a measurement reporting method according to an embodiment of the present disclosure is provided. The specific steps are as follows.

Figure 6:
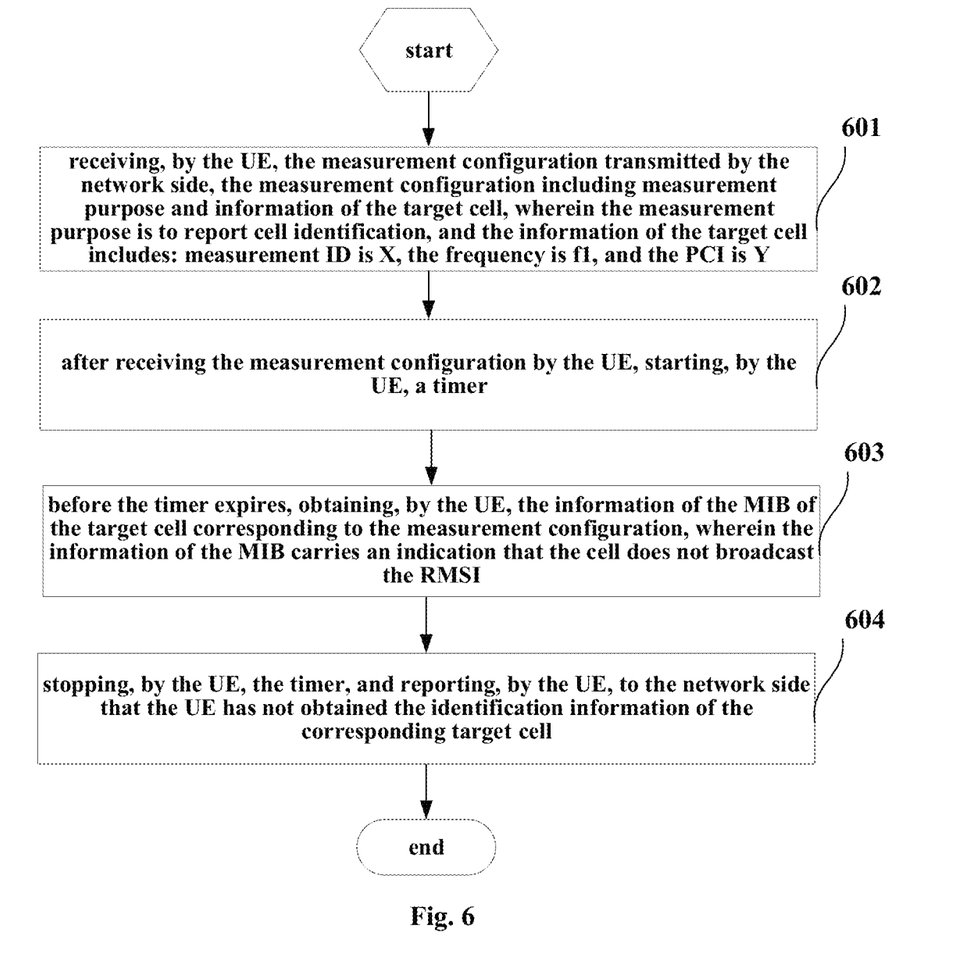
FIG. 6 is a third flowchart of the measurement reporting method according to an embodiment of the present disclosure.

Step 601: receiving, by the UE, the measurement configuration transmitted by the network side, the measurement configuration including measurement purpose and information of the target cell, wherein the measurement purpose is to report cell identification, and the information of the target cell includes: measurement ID is X, the frequency is f1, and the PCI is Y.

Step 602: after receiving the measurement configuration by the UE, starting, by the UE, a timer;

Optionally, a timing length of the timer may be configured by the network side or agreed by the protocol.

Step 603: before the timer expires, obtaining, by the UE, the information of the MIB of the target cell corresponding to the measurement configuration, wherein the information of the MIB carries an indication that the cell does not broadcast the RMSI.

Step 604: stopping, by the UE, the timer, and reporting, by the UE, to the network side that the UE has not obtained the identification information of the corresponding target cell.

Optionally, the UE reports to the network side explicitly or implicitly that the identification information of the corresponding target cell is not obtained by the UE.

1) Content of the explicit report includes any one or more of the following: that the measurement ID=X, that ID indication of the target cell is not obtained, and that the target cell does not broadcast the RMSI indication, etc.;
2) Content of the implicit report includes: the measurement ID is X, but does not contain information of valid TAC, CGI and PLMN, that is, it does not contain all the above information or a value of the reported information is out of a normal value range. After receiving the reported content, the network side can infer that the UE failed to read the identification information of the target cell.

In this way, it is unnecessary for the UE to wait for expiring of the timer before triggering to report, and an ANR measurement process of the UE is accelerated.

Example 2: A Scenario in which the RMSI is Broadcast Over the Network is Provided Referring to FIG. 7, a flowchart of a measurement reporting method according to an embodiment of the present disclosure is provided. The specific steps are as follows.

Figure 7:
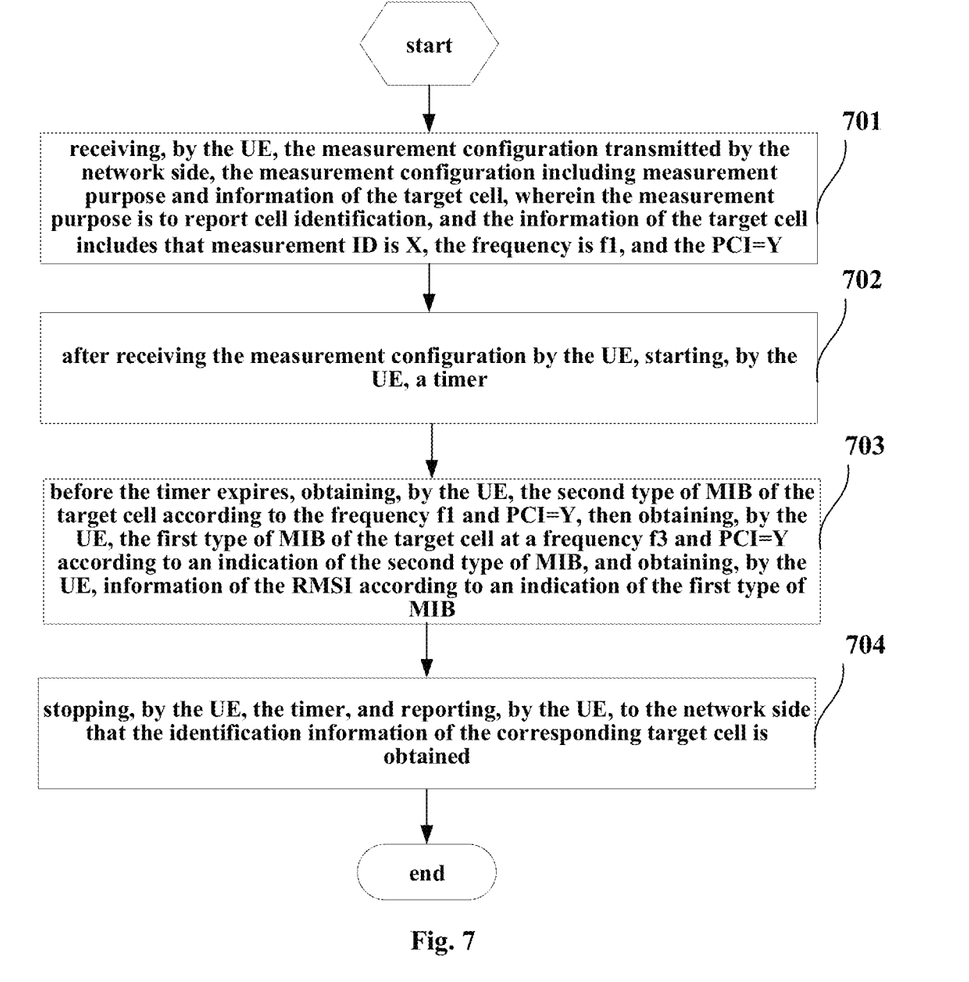
FIG. 7 is a fourth flowchart of the measurement reporting method according to an embodiment of the present disclosure.

Step 701: receiving, by the UE, the measurement configuration transmitted by the network side, the measurement configuration including measurement purpose and information of the target cell, wherein the measurement purpose is to report cell identification, and the information of the target cell includes that measurement ID is X, the frequency is f1, and the PCI=Y.

Step 702: after receiving the measurement configuration by the UE, starting, by the UE, a timer.

Optionally, a timing length of the timer may be configured by the network side or agreed by the protocol.

Step 703: before the timer expires, obtaining, by the UE, the second type of MIB of the target cell according to the frequency f1 and PCI=Y, then obtaining, by the UE, the first type of MIB of the target cell at a frequency f3 and PCI=Y according to an indication of the second type of MIB, and obtaining, by the UE, information of the RMSI according to an indication of the first type of MIB.

Step 704: stopping, by the UE, the timer, and reporting, by the UE, to the network side that the identification information of the corresponding target cell is obtained.

In the embodiments of the present disclosure, the reported content includes one or a combination of two or more of the following: measurement ID=X; frequency f3 where the first type of MIB is located; PCI=Y of the target cell; and obtained information such as TAC, CGI, and PLMN.

In this way, it is unnecessary for the UE to wait for expiring of the timer before triggering the report, and an ANR measurement process of the UE is accelerated.

A UE is further provided in the embodiments of the present disclosure. Since a principle of solving a problem by the UE is similar to a principle of solving a problem by the measurement reporting method in the embodiments of the present disclosure, an implementation of the UE may refer to an implementation of the method, and a description thereof will not be repeated herein.

Figure 8:
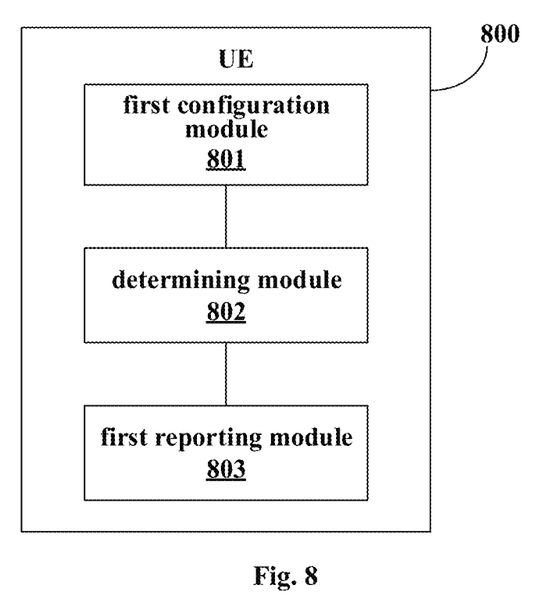
FIG. 8 is a first structural diagram of a UE according to an embodiment of the present disclosure.

Referring to FIG. 8, a structure of a UE 800 according to an embodiment of the present disclosure is provided. The UE 800 includes: a first configuration module 801, used to start a timer according to a measurement configuration of a target cell transmitted by a network side; a determining module 802, used to determine, before the timer expires, that identification information of the target cell cannot be obtained; and a first reporting module 803, used to report, to the network side, that the identification information of the target cell cannot be obtained by the UE.

In the embodiment of the present disclosure, optionally, the first reporting module 803 is further used to: instruct the timer to stop from operating before the timer expires; and report, to the network side, that the identification information of the target cell cannot be obtained by the UE.

In the embodiment of the present disclosure, optionally, the determination module 802 is further used to: obtain, before the timer expires, information of an MIB of the target cell according to the measurement configuration; and when the information of the MIB carries a first indication indicating that the target cell does not broadcast RMSI, determine that the identification information of the target cell cannot be obtained.

In an embodiment of the present disclosure, optionally, the first indication is represented by one or several predetermined code points or a combination of the predetermined code points, wherein the one or more predetermined code points are carried by one field in the information of the MIB, and the combination of the predetermined code points is carried by multiple fields in the information of the MIB.

In the embodiment of the present disclosure, optionally, the first reporting module 803 is further used to: explicitly or implicitly report, to the network side, that the identification information of the target cell cannot be obtained by the UE.

In the embodiment of the present disclosure, optionally, the first reporting module 803 is further used to: transmit second indication information to the network side, wherein the second indication information indicates that the target cell does not broadcast the identification information of the cell or RMSI.

The UE provided by the embodiments of the present disclosure may execute the above method embodiments, and implementation principles and technical effects thereof are similar, a description thereof will not be repeated in this embodiment.

A UE is further provided in the embodiments of the present disclosure. Since a principle of solving a problem by the UE is similar to a principle of solving a problem by the measurement reporting method in the embodiments of the present disclosure, an implementation of the UE may refer to an implementation of the method, and a description thereof will not be repeated herein.

Figure 9:
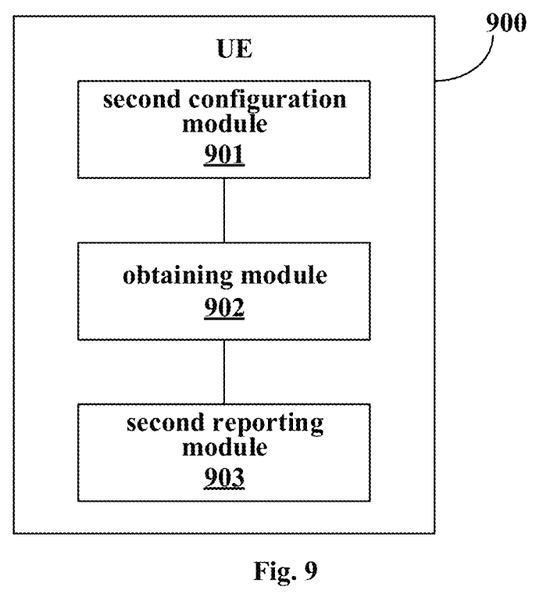
FIG. 9 is a second structural diagram of the UE according to an embodiment of the present disclosure.

Referring to FIG. 9, a structure of a UE 900 according to an embodiment of the present disclosure is provided. The UE 900 includes: a second configuration module 901, used to start a timer according to a measurement configuration of a target cell transmitted by a network side; an obtaining module 902, used to obtain, before the timer expires, system information required by the target cell; and a second reporting module 903, used to transmit, to the network side, the system information required by the target cell and a transmission frequency of an MIB, wherein the MIB is an MIB of transmission location information of RMSI, and the transmission location information of the RMSI is actually read by the UE.

In an embodiment of the present disclosure, optionally, the second reporting module 903 is further used to: instruct the timer to stop from operating; and transmit, to the network side, the system information required by the target cell and the transmission frequency of the MIB.

In an embodiment of the present disclosure, optionally, the timer is configured by a network side or predefined in a protocol.

The UE provided by the embodiments of the present disclosure may execute the above method embodiments, and implementation principles and technical effects thereof are similar, a description thereof will not be repeated in this embodiment.

Figure 10:
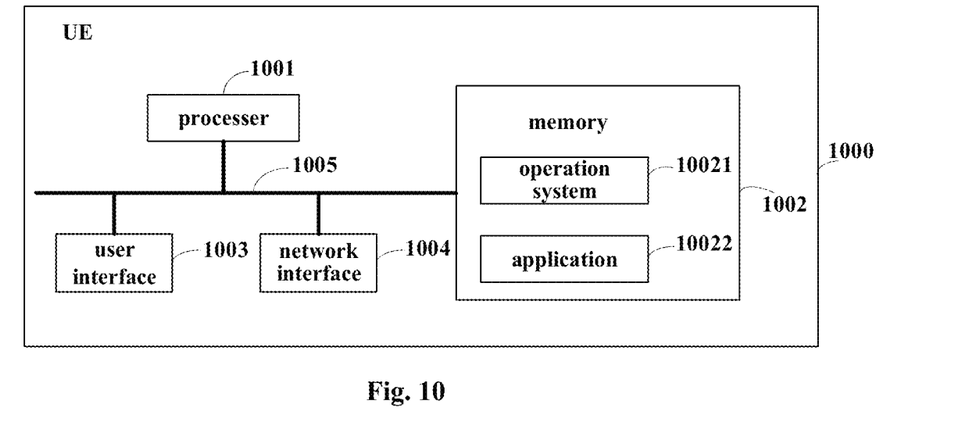
FIG. 10 is a third structural diagram of the UE according to an embodiment of the present disclosure.

As shown in FIG. 10, the UE 1000 includes: at least one processor 1001, a memory 1002, at least one network interface 1004, a user interface 1003. Various components in the UE 1000 are coupled together by a bus system 1005. It should be appreciated that the bus system 1005 is used to implement connection communication between these components. In addition to a data bus, the bus system 1005 further includes a power bus, a control bus, and a status signal bus. However, for clarity of description, various buses are all labeled as the bus system 1005 in FIG. 10.

The user interface 1003 may include a display, a keyboard, a pointing device (for example, a mouse, a trackball), a touch pad, or a touch screen, etc.

It should be appreciated that the memory 1002 in this embodiment of the present disclosure may be a volatile memory or a non-volatile memory, or may include both the volatile memory and the non-volatile memory. The non-volatile memory may be a Read Only Memory (ROM), a Programmable Read Only Memory (PROM), an Erasable Programmable Read Only Memory (EPROM), an Electrically Erasable Programmable Read Only Memory (EEPROM) or flash memory. The volatile memory may be a Random Access Memory (RAM) that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM) and a Direct Rambus Random Access Memory (DRRAM). The memory 1002 of the systems and methods described in the embodiments of the present disclosure is intended to include, without being limited to, these and any other suitable types of memories.

In some embodiments, the memory 1002 stores the following elements, executable modules or data structures, or a subset thereof, or an extended set thereof: an operating system 10021 and an application 10022.

The operating system 10021 includes various system programs, such as a framework layer, a core library layer and a driver layer, for implementing various basic services and processing hardware-based tasks. The application 10022 includes various applications, such as a Media Player and a Browser, for implementing various application services. A program implementing the method of the embodiments of the present disclosure may be included in the application 10022.

In the embodiments of the present disclosure, the following steps may be implemented when a program or an instruction stored in the memory 1002, specifically, a program or an instruction stored in the application 10022, is executed: starting a timer according to a measurement configuration of a target cell transmitted by a network side; determining, before the timer expires, that identification information of the target cell cannot be obtained; and reporting, to the network side, that the identification information of the target cell cannot be obtained by the UE.

Alternatively, in the embodiments of the present disclosure, the following steps may be implemented when a program or an instruction stored in the memory 1002, specifically, a program or an instruction stored in the application 10022, is executed: starting a timer according to a measurement configuration of a target cell transmitted by a network side; obtaining, before the timer expires, system information required by the target cell; and transmitting, to the network side, the system information required by the target cell and a transmission frequency of an MIB, wherein the MIB is an MIB of transmission location information of RMSI, and the transmission location information of the RMSI is actually read by the UE.

The UE provided by the embodiments of the present disclosure may execute the above method embodiments, and implementation principles and technical effects thereof are similar, a description thereof will not be repeated in this embodiment.

Steps of a method or an algorithm described in combination with the present disclosure may be implemented in hardware, or may be implemented in a software instruction executed by a processor. The software instruction may be composed of a corresponding software module, and the software module may be stored in a RAM, flash memory, ROM, EPROM, EEPROM, register, hard disk, mobile hard disk, read-only optical disk, or any other form of storage medium known in the art. An exemplary storage medium is coupled to the processor, so that the processor can read information from, and write information to, the storage medium. Naturally, the storage medium may also be a part of the processor. The processor and the storage medium may be arranged in an Application Specific Integrated Circuit (ASIC). In addition, the ASIC may be arranged in a core network interface device. Naturally, the processor and the storage medium may also exist in the core network interface device as discrete components.

A person skilled in the art should appreciate that, in one or more of the above examples, the functions described in the present disclosure may be implemented in hardware, software, firmware, or any combination thereof. When being implemented in software, the functions may be stored on a computer-readable medium or transmitted as one or more instructions or codes on the computer-readable medium. The computer-readable medium includes a computer storage medium and a communication medium, wherein the communication medium includes any medium that facilitates transfer of a computer program from one place to another. The storage medium may be any available medium that may be accessed by a general purpose or special purpose computer.

Specific implementations described above further describe objectives, technical solutions, and beneficial effects of the present disclosure in detail. It should be understood that the above descriptions are merely specific implementations of the present disclosure, and are not intended to limit the protection scope of the present disclosure. Any modification, equivalent replacement, or improvement, and the like made based on the technical solutions of the present disclosure shall be included in the protection scope of the present disclosure.

A person skilled in the art should understand that the embodiments of the present disclosure may be provided as a method, a system, or a computer program product. Therefore, the embodiments of the present disclosure may take a form of entirely hardware embodiments, entirely software embodiments, or embodiments combining software and hardware. Moreover, the embodiments of the present disclosure may take a form of a computer program product implemented on one or more computer-usable storage medium (including but not limited to magnetic disk storage, Compact Disc (CD)-ROM, optical storage, etc.) containing computer-usable program code.

The embodiments of the present disclosure are described with reference to flowcharts and/or block diagrams of methods, devices (systems), and computer program products according to the embodiments of the present disclosure. It should be appreciated that each flow and/or block in the flowcharts and/or block diagrams, and combinations of flows and/or blocks in the flowcharts and/or block diagrams can be implemented by computer program instructions. These computer program instructions may be provided to a processor of a general-purpose computer, a special-purpose computer, an embedded processing device, or other programmable data processing device to produce a machine, so that instructions executed by the processor of the computer or the other programmable data processing device are used to generate a device for implementing functions specified in one or more flows of the flowchart and/or one or more blocks of the block diagram.

These computer program instructions may also be stored in a computer-readable storage capable of directing a computer or other programmable data processing device to operate in a specific manner, so that the instructions stored in the computer-readable storage produce a product including an instruction device. The instruction device implements functions specified in one or more flows of the flowchart and/or one or more blocks of the block diagram.

These computer program instructions may also be loaded onto the computer or the other programmable data processing device, so that a series of operational steps may be performed on the computer or the other programmable device to generate a computer-implemented process, and the computer or the other programmable device executes the instructions to provide steps for implementing functions specified in one or more flows of the flowchart and/or one or more blocks of the block diagram.

Obviously, a person skilled in the art can make various modifications and variations to the embodiments of the present disclosure without departing from the spirit and scope of the present disclosure. Thus, when these modifications and variations of the embodiments of the present disclosure fall within the scope of the claims and their equivalent of the present disclosure, the present disclosure also intends to include these modifications and variations.

What is claimed is:

1. A User Equipment (UE), comprising: a processor, a memory, and a computer program stored in the memory and used to be executed by the processor, wherein the processor is configured to execute the computer program, to implement steps of a measurement reporting method comprising:
    starting a timer according to a measurement configuration of a target cell transmitted by a network side;
    obtaining, before the timer expires, system information required by the target cell; and
    transmitting, to the network side, the system information required by the target cell and a transmission frequency of an Master Information Block (MIB), wherein the MIB is an MIB of transmission location information of Remaining Minimum System Information (RMSI), and the transmission location information of the RMSI is actually read by the UE.

2. The UE according to claim 1, wherein transmitting to the network side the system information required by the target cell and the transmission frequency of the MIB comprises:
    stopping the timer; and
    transmitting, to the network side, the system information required by the target cell and the transmission frequency of the MIB.

3. The UE according to claim 1, wherein the timer is configured by a network side or predefined in a protocol.

4. A non-transitory computer-readable storage medium storing therein a computer program, wherein the computer program is used to be executed by a processor, to implement steps of a measurement reporting method comprising:
    starting a timer according to a measurement configuration of a target cell transmitted by a network side;
    obtaining, before the timer expires, system information required by the target cell; and
    transmitting, to the network side, the system information required by the target cell and a transmission frequency of an Master Information Block (MIB), wherein the MIB is an MIB of transmission location information of Remaining Minimum System Information (RMSI), and the transmission location information of the RMSI is actually read by a User Equipment (UE).

5. The non-transitory computer-readable storage medium according to claim 4, wherein transmitting to the network side the system information required by the target cell and the transmission frequency of the MIB comprises:
    stopping the timer; and
    transmitting, to the network side, the system information required by the target cell and the transmission frequency of the MIB.

6. The non-transitory computer-readable storage medium according to claim 4, wherein the timer is configured by a network side or predefined in a protocol.

7. A non-transitory computer-readable storage medium storing therein a computer program, wherein the computer program is used to be executed by a processor, to implement steps of a measurement reporting method comprising:
    starting a timer according to a measurement configuration of a target cell transmitted by a network side;
    obtaining, before the timer expires, information of the Master Information Block (MIB) of the target cell according to the measurement configuration; wherein, the MIB carries a first indication indicating that the target cell does not broadcast Remaining Minimum System Information (RMSI); and
    stopping the timer and transmitting second indication information to the network side, wherein the second indication information indicates that the target cell does not broadcast the RMSI.

8. The non-transitory computer-readable storage medium according to claim 7, wherein
    the timer is stopped before the timer expires.

9. The non-transitory computer-readable storage medium according to claim 7, further comprising:
   determining that the identification information of the target cell cannot be obtained.

10. The non-transitory computer-readable storage medium according to claim 7, wherein the first indication is represented by one or several predetermined code points or a combination of the predetermined code points, wherein the one or more predetermined code points are carried by one field in the information of the MIB, and the combination of the predetermined code points is carried by multiple fields in the information of the MIB.

* * * * *